(12) United States Patent
Yoon et al.

(10) Patent No.: US 9,189,857 B2
(45) Date of Patent: Nov. 17, 2015

(54) APPARATUS AND METHOD FOR RECONSTRUCTING THREE DIMENSIONAL FACES BASED ON MULTIPLE CAMERAS

(71) Applicant: ELECTRONICS AND TELECOMMUNICATIONS RESEARCH INSTITUTE, Daejeon (KR)

(72) Inventors: Seung-Uk Yoon, Bucheon-si (KR); Kap-Kee Kim, Daejeon (KR); Bon-Woo Hwang, Daejeon (KR); Ji-Hyung Lee, Daejeon (KR); Bon-Ki Koo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 278 days.

(21) Appl. No.: 13/888,333

(22) Filed: May 6, 2013

(65) Prior Publication Data

US 2013/0301906 A1 Nov. 14, 2013

(30) Foreign Application Priority Data

May 11, 2012 (KR) ........................ 10-2012-0050168

(51) Int. Cl.
*G06K 9/00* (2006.01)
*G06T 7/00* (2006.01)
*G06T 17/00* (2006.01)

(52) U.S. Cl.
CPC ............. *G06T 7/0059* (2013.01); *G06T 7/0075* (2013.01); *G06T 17/00* (2013.01);
(Continued)

(58) Field of Classification Search
None
See application file for complete search history.

(56) References Cited

U.S. PATENT DOCUMENTS

| 7,065,242 B2 * | 6/2006 | Petrov et al. | 382/154 |
| 8,223,147 B1 * | 7/2012 | El Dokor et al. | 345/424 |
| 2006/0152506 A1 * | 7/2006 | Chu et al. | 345/423 |
| 2006/0221072 A1 * | 10/2006 | Se et al. | 345/420 |

(Continued)

FOREIGN PATENT DOCUMENTS

| KR | 10-2007-0009899 A | 1/2007 |
| KR | 10-2008-0006902 A | 1/2008 |

OTHER PUBLICATIONS

Zollhoefer et al. "Automatic Reconstruction of Personalized Avatars from 3D Face Scans", Computer Animation and Virtual Worlds, Wiley-Blackwell, 2011, 22 (2-3), pp. 195.*

(Continued)

*Primary Examiner* — Jason Heidemann

(57) ABSTRACT

Disclosed herein are an apparatus and method for reconstructing a three-dimensional (3D) face based on multiple cameras. The apparatus includes a multi-image analysis unit, a texture image separation unit, a reconstruction image automatic synchronization unit, a 3D appearance reconstruction unit, and a texture processing unit. The multi-image analysis unit determines the resolution information of images received from a plurality of cameras, and determines whether the images have been synchronized with each other. The texture image separation unit separates a texture processing image by comparing the resolutions of the received images. The reconstruction image automatic synchronization unit synchronizes images that are determined to be asynchronous images by the multi-image analysis unit. The 3D appearance reconstruction unit computes the 3D coordinate values of the synchronized images, and reconstructs a 3D appearance image. The texture processing unit reconstructs a 3D image by mapping the texture processing image to the 3D appearance image.

15 Claims, 7 Drawing Sheets

(52) U.S. Cl.
CPC .. *G06T 2200/08* (2013.01); *G06T 2207/10012* (2013.01); *G06T 2207/10024* (2013.01); *G06T 2207/30201* (2013.01)

(56) References Cited

U.S. PATENT DOCUMENTS

| | | | | |
|---|---|---|---|---|
| 2009/0021522 A1* | 1/2009 | Burley et al. | ............... | 345/582 |
| 2010/0309292 A1 | 12/2010 | Ilo et al. | | |
| 2011/0148864 A1* | 6/2011 | Lee et al. | ............... | 345/419 |
| 2011/0148866 A1* | 6/2011 | Chu et al. | ............... | 345/419 |
| 2012/0162215 A1* | 6/2012 | Cha et al. | ............... | 345/419 |

OTHER PUBLICATIONS

Tong et al. "[Scanning 3D Full Human Bodies Using Kinects", IEEE Trans.Vis. Comput. Graph., vol. 18, No. 4, pp. 643-650 2012], Examiner notes that an earlier version was posted online Mar. 4, 2012.*

Javaid, "Sort Image Collection by Resolution Using Dimensions 2 Folders", Oct. 11, 2011, [online] [retrieved on Apr. 4, 2015]. Retrieved from: http://www.addictivetips.com/windows-tips/sort-image-collection-by-resolution-using-dimensions-2-folders/.*

Lee et al., "An Intuitive System for 3D Avatar with High-quality", 2010, IEEE, Consumer Electronics (ICCE), 517-518.*

Choi et al., "Intuitive 3D Caricature Face Maker", Dec. 15-18, 2010, ACM SIGGRAPH Asia 2010.*

Lim et al. "Automatic generation system of the 3D character model for Smart TV contents production" Jan. 13-16, 2012, IEEE, Consumer Electronics (ICCE) 2012, 572-573.*

Andreas Geiger et al., "Efficient Large-Scale Stereo Matching," Asian Conference on Computer Vision, 2010, pp. 1-14.

* cited by examiner

APPARATUS AND METHOD FOR RECONSTRUCTING THREE DIMENSIONAL FACES BASED ON MULTIPLE CAMERAS

CROSS REFERENCE TO RELATED APPLICATION

This application claims the benefit of Korean Patent Application No. 10-2012-0050168, filed on May 11, 2012, which is hereby incorporated by reference in its entirety into this application.

BACKGROUND OF THE INVENTION

1. Technical Field

The present invention relates generally to an apparatus and method for reconstructing three dimensional (3D) faces based on multiple cameras and, more particularly, to an apparatus and method that are capable of effectively reconstructing 3D face images using color and depth images.

2. Description of the Related Art

Conventional 3D face reconstruction systems are chiefly intended for movies. Since the conventional 3D face reconstruction systems aim to reconstruct objects that are most similar to actual objects, almost all equipment is expensive, the installation of the systems is complicated, and the installation and use of the systems require experts. Conventional face reconstruction systems for medical applications are each equipped with multiple DSLR-class cameras and an expensive structured-light projector.

Furthermore, cameras and projectors used in such systems are of synchronous type, so that problems arise in that an additional device is required to achieve synchronization and in that reconstruction performance is rapidly deteriorated when synchronization is not established.

Meanwhile, recently, with the development of computer vision technology, there have been increasing attempts to reconstruct faces in three dimensions using inexpensive cameras such as mobile phone camera and web cameras. This technology has the advantage of being convenient, and may be used for applications for amusement because it is focused on entertainment. However, this technology is disadvantageous in that it cannot be used in the beauty and medical fields because of its low reconstruction quality.

A variety of experiments and research for acquiring the 3D depth information of an object using one or more depth cameras have been actively conducted. Since a low-price depth camera cannot receive synchronizing signals, a synchronization problem occurs when multiple heterogeneous depth cameras are used or one or more depth cameras are used along with another type of camera.

Conventional approaches for solving the problem of the synchronization between heterogeneous cameras include a scheme for performing synchronization using sound, and a scheme for indicating time codes in captured image frames and then performing synchronization. However, the scheme for performing synchronization using sound is disadvantageous in that it is difficult to automate the scheme and synchronization should be performed after the capturing of images by manually comparing sound with image signals through post processing. The scheme for performing synchronization using time codes is also performed by comparing time codes through post processing step and aligning images having the same time code. However, this scheme can be automated because comparing only time codes or time stamps is sufficient. Accordingly, in order to acquire images while automatically synchronizing the images during capturing and reconstruct the 3D appearance of an object using the acquired images, it is difficult to use the conventional schemes.

Meanwhile, in order to create 3D content for stereoscopic TV such as 3D TV or multi-view TV, a scheme was proposed for constructing a heterogeneous multi-camera system using a depth camera and a high-resolution camera together and improving a low-resolution depth map acquired by the depth camera using information acquired by the high-resolution camera.

In the above applications, synchronization is essential when heterogeneous cameras are used together, and a depth camera capable of supporting synchronization is very expensive. Accordingly, the system is very expensive, and the installation and environmental settings of the system require a long time and professional knowledge.

Korean Patent Application Publication No. 2007-0009899 discloses an apparatus for creating a 3D model on the assumption that synchronized images are received via multiple stereo cameras. The technology disclosed in the publication has some limitations in that it is impossible to use an asynchronous camera and received images should have the same resolution.

Accordingly, there is an urgent need for a new technology that can reconstruct 3D images.

SUMMARY OF THE INVENTION

Accordingly, the present invention has been made keeping in mind the above problems occurring in the prior art, and an object of the present invention is to provide an apparatus and method that can solve a synchronization problem that occurs when multiple heterogeneous cameras are used together and that can increase convenience in the installation and use of a system, thereby enabling a system to be easily and conveniently used without an expert.

Another object of the present invention is to provide an apparatus and method that use one or more depth image cameras and one or more color image cameras, thereby facilitating the construction of a 3D face.

Still another object of the present invention is to provide an apparatus and method that use multiple inexpensive cameras in combination, thereby reducing the time it takes to reconstruct a 3D face and also improving cost competitiveness and quality.

In order to accomplish the above object, the present invention provides an apparatus for reconstructing 3D faces based on multiple cameras, including a multi-image analysis unit configured to determine the resolution information of images received from a plurality of cameras, and to determine whether the images have been synchronized with each other; a texture image separation unit configured to separate a texture processing image by comparing resolutions of the received images; a reconstruction image automatic synchronization unit configured to synchronize images that are determined to be asynchronous images by the multi-image analysis unit; a 3D appearance reconstruction unit configured to compute the 3D coordinate values of the synchronized images, and to reconstruct a 3D appearance image; and a texture processing unit configured to reconstruct a 3D image by mapping the texture processing image to the 3D appearance image.

The reconstruction image automatic synchronization unit may operate in different modes depending on whether a depth image is included in the received images.

The 3D appearance reconstruction unit may compute the 3D coordinates of an object using depth information of a depth image received from a depth image camera, and then reconstruct the 3D appearance image.

The 3D appearance reconstruction unit may triangulate entire image regions based on boundary surfaces of an object in color images received from a plurality of color image cameras, and then reconstruct the 3D appearance image.

The texture image separation unit may separate an image whose resolution is the highest of those of the received images as the texture processing image.

The multi-image analysis unit may include an image resolution comparison unit configured to analyze resolutions of the received images, and to compare the resolutions of the images; an image information classification unit configured to classify the received images into color images or depth images; and a synchronization checking unit configured to convert an image classified as a color image by the image information classification unit into a grayscale image, and to determine whether the grayscale image and the remaining images have been synchronized with each other.

The reconstruction image automatic synchronization unit may include a plurality of image buffers configured to divide frames of the images determined to be asynchronous images by a predetermined time interval and then store them; and a synchronization checking unit configured to detect a time interval of a frame whose synchronization is the highest of the images determined to be asynchronous images and then takes an image in the time interval as a synchronous image.

The image buffers may be classified into one or more color image buffers for processing color images and one or more image buffers for processing depth images, and the number of image buffers is equal to the number of cameras that received images.

In order to accomplish the above object, the present invention provides a method of reconstructing 3D faces using an apparatus for reconstructing a 3D face based on multiple cameras, including receiving images from a plurality of cameras; analyzing types and resolutions of the received images; separating a texture processing image by comparing the analyzed resolutions of the images; checking whether the received images except the separated image have been synchronized with each other; synchronizing images determined to be asynchronous images with each other; computing 3D coordinate values for the synchronized images and reconstructing a 3D appearance image; and mapping the texture processing image to the 3D appearance image.

The separating may include separating an image whose resolution is the highest of those of the analyzed images as the texture processing image.

The checking may include, if a color image is included in the received images except the separated image, converting the color image into a grayscale image; computing the insufficiency level of the synchronization between the grayscale image and the remaining images; and determining whether the insufficiency level of the synchronization is equal to or higher than a predetermined allowable reference value, and determining the images to be asynchronous images if the insufficiency level of the synchronization is equal to or higher than the predetermined allowable reference value.

The synchronizing may include dividing the frames of the images determined to be the asynchronous images by a predetermined time interval; storing the images determined to be asynchronous images in a plurality of image buffers, respectively; and detecting the time interval of a frame whose synchronization is the highest of the images determined to be asynchronous images and then taking an image in the time interval as a synchronous image.

The image buffers may be classified into one or more color image buffers for processing color images and one or more image buffers for processing depth images, and the number of image buffers is equal to the number of cameras that received images.

The mapping may include reconstructing a 3D face image by mapping the texture processing image to the 3D appearance image using the step size information of images that are used as the texture processing image and the 3D appearance image.

The analyzing may be performed in different 3D appearance image reconstruction modes depending whether a depth image is included in the received images.

The computing and reconstructing may include computing the 3D coordinates of an object using the depth information of a depth image received from a depth image camera; and projecting the 3D coordinates onto the location of a color image camera, determining the relationship of correspondence between the depth image and a color image, and reconstructing the 3D appearance image.

The computing and reconstructing may include triangulating entire image regions based on boundary surfaces of an object in color images received from a plurality of color image cameras; computing differences by comparing the color values of the images for triangles created by the triangulation; and computing 3D coordinates for the differences using camera information and then reconstructing the 3D appearance image.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
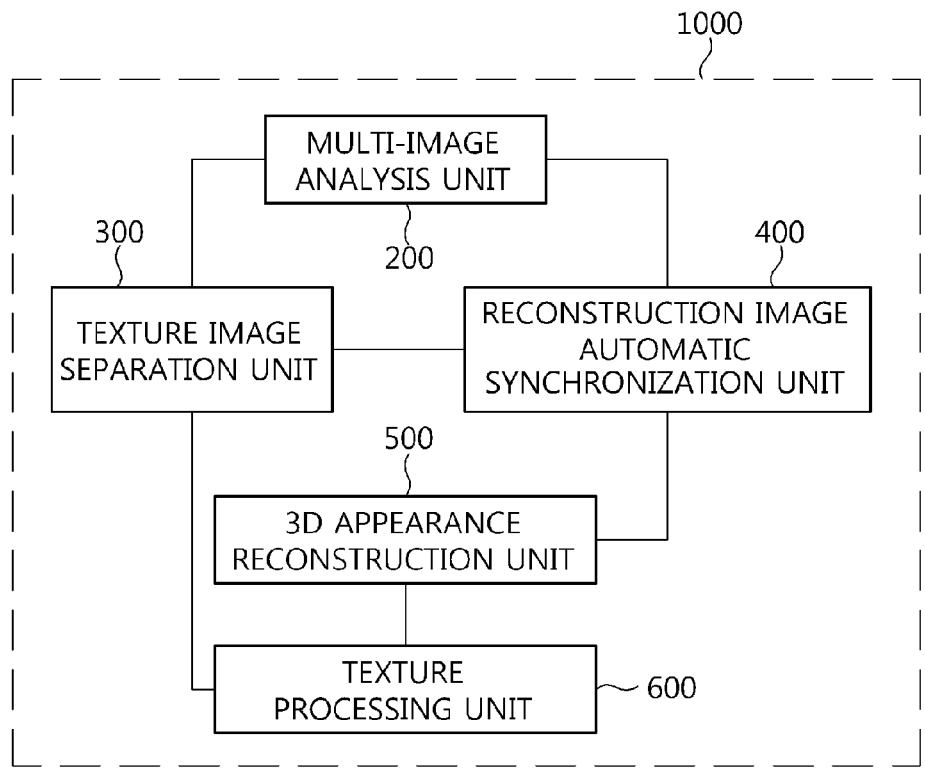
FIG. 1 is a diagram showing an apparatus for reconstructing a 3D face based on multiple cameras according to an embodiment of the present invention.

The present invention will be described in detail below with reference to the accompanying drawings. Repeated descriptions and descriptions of known functions and constructions which have been deemed to make the gist of the present invention unnecessarily vague will be omitted below. The embodiments of the present invention are provided in order to fully describe the present invention to those having ordinary knowledge in the art. Accordingly, the shapes, sizes, etc. of elements in the drawings may be exaggerated to make the description clear.

Embodiments of the present invention will be described in detail with reference to the accompanying drawings.

FIG. 1 is a diagram showing an apparatus 1000 for reconstructing a 3D face based on multiple cameras according to an embodiment of the present invention.

Referring to FIG. 1, the apparatus 1000 for reconstructing a 3D face based on multiple cameras includes a multi-image analysis unit 200, a texture image separation unit 300, a reconstruction image automatic synchronization unit 400, a 3D appearance reconstruction unit 500, and a texture processing unit 600.

Figure 2:
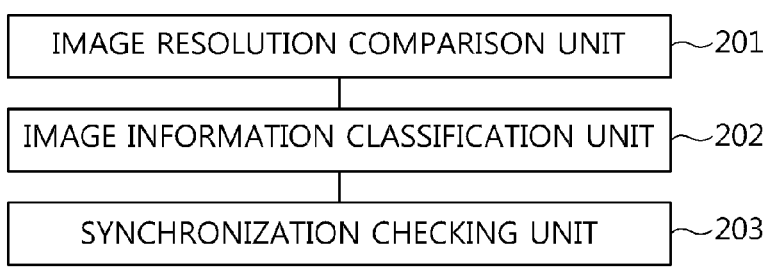
FIG. 2 is a diagram showing the detailed configuration of a multi-image analysis unit according to an embodiment of the present invention.
Figure 3:
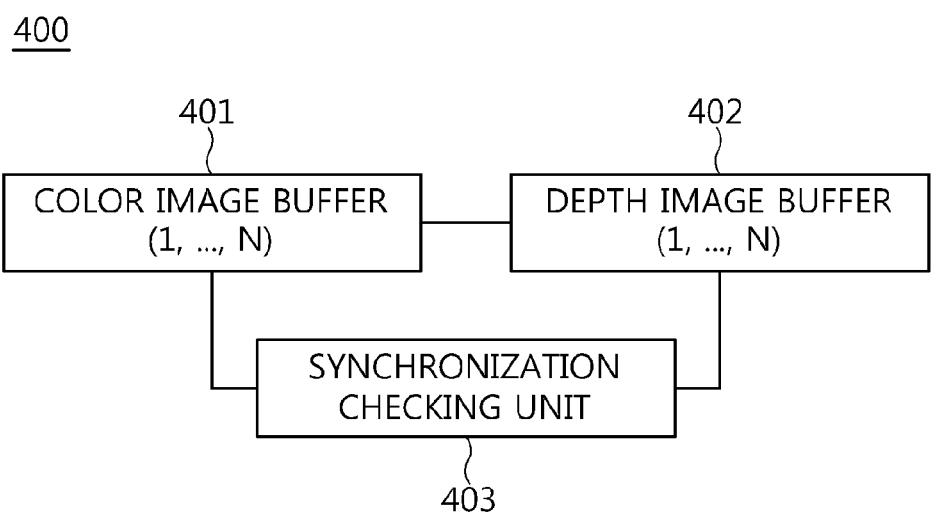
FIG. 3 is a diagram showing the detailed configuration of a reconstruction image automatic synchronization unit according to an embodiment of the present invention.

Referring to FIG. 2, the multi-image analysis unit 200 includes an image resolution comparison unit 201, an image information classification unit 202, and a synchronization checking unit 203.

The multi-image analysis unit 200 may determine the resolution information of a plurality of images received from cameras, including one or more depth image cameras (hereinafter also referred to as the "depth cameras") or one or more color image cameras (hereinafter also referred to as the "color cameras"), and check whether the images have been synchronized with each other.

The image resolution comparison unit 201 may analyze the resolutions of the received images and compare the resolutions of the images.

The image information classification unit 202 may classify the received images except a texture processing image into color images and depth images.

The images except a texture processing image are classified in detail into a case in which only a depth image is received, a case in which only two or more color images are received, a case in which one depth image and two or more color images are received, and a case in which two or more depth images and two or more color images are received.

The synchronization checking unit 203 may convert the image, classified as a color image by the image information classification unit 202, into a grayscale image and determine the insufficiency level of the synchronization between the grayscale image and the depth images.

If the insufficiency level of the synchronization is equal to or higher than a predetermined allowable reference value, the images are determined not to have been synchronized with each other and are then transferred to the reconstruction image automatic synchronization unit 400.

In contrast, if the insufficiency level of the synchronization is lower than the predetermined allowable reference value, the images are determined to have been synchronized with each other and are then transferred to the 3D appearance reconstruction unit without undergoing a synchronization process.

The texture image separation unit 300 separates a texture processing image by comparing the resolutions of the received images based on the information of the received images that are analyzed by the multi-image analysis unit 200. Here, it is preferred that the texture processing image be an image having the highest resolution.

The texture image separation unit 300 provides the separated texture processing image to the texture processing unit 600. In this case, information (step size) about the ratio between the resolution of the 3D appearance reconstruction image and the resolution of the texture processing image may be also transferred.

The reconstruction image automatic synchronization unit 400 may include image buffers, and a synchronization checking unit 403.

Here, the image buffers may include color image buffers 401 for processing color images and depth image buffers 402 for processing depth images. Furthermore, the number of buffers may be equal to that of cameras that received images.

Here, the reconstruction image automatic synchronization unit 400 may operate in different modes depending on whether the received images include depth images.

The reconstruction image automatic synchronization unit 400 automatically synchronize the images, determined to be asynchronous images by the multi-image analysis unit 200, by storing images in the newest frames using the color and depth image buffers 401 and 402.

The image buffers 401 and 402 divide the frames of the images, determined to be asynchronous images, by a predetermined time interval and then store them, and the synchronization checking unit 403 detects the time interval of a frame whose synchronization level is the highest of those of the images stored in the image buffers 401 and 402, and takes an image in the time interval as a synchronous image.

In other words, when images received at time T are not synchronized, additional images are received at times T+1, T+2, . . . , and T+N (N is the buffer size) based on the previously determined image buffer size, and the synchronization checking unit 403 detects the time at which the difference between the images is minimum and takes an image at the time as a synchronous image.

Here, a multi-input image may not be received at time T, but may be received in a stream form. That is, a one-or several-second image is captured after the adjustment of the time in a moving image mode during the capturing of a face, and images are stored through buffering based on a specific time frame interval, thereby performing synchronization.

In the reconstruction of a 3D object according to the present invention, a user mostly sits motionless or assumes a motionless posture, unlike in general 3D object reconstruction, and thus automatic synchronization processing can be performed at high quality, unlike in the general 3D object reconstruction.

The 3D appearance reconstruction unit 500 extracts depth information about an object from the received images, and computes 3D coordinate values using the extracted depth information. The final reconstruction results are obtained by a texturing process of adding a texture image to the 3D appearance computed as described above.

The 3D appearance reconstruction unit 500 extracts depth information about an object from the received images, computes 3D coordinate values using the depth information, reconstructs a 3D appearance image, and transfers the reconstructed image to the texture processing unit 600.

Here, the reconstruction of the 3D appearance may be performed in different modes depending on whether the reconstruction image automatic synchronization unit 400 includes a depth image.

That is, the reconstruction of the 3D appearance may be performed in two manners depending on whether there is depth information.

If depth information or a depth image is received from a depth camera, 3D coordinates of an object are computed using the depth information and are then projected onto the location of a web camera or a CMOS camera, thereby being used as an initial value that is used to compute the relation of correspondence between color images.

If there is no depth camera, the relationship of correspondence between images is computed using only the images from color cameras. When the relation of correspondence is computed using depth information as an initial value, a typical stereo matching method may be used.

In the other manner, there may be used a technique of triangulating the entire image regions based on the boundary surfaces of objects in color images received from a plurality of color image cameras, computing 3D coordinates for triangles created by the triangulation by comparing the color values of the images, and then reconstructing a 3D appearance image.

The corresponding point depth information between color images is distance information at each pixel location. When the depth information is inversely projected onto 3D space and then projected onto the location of each camera, each point in 3D space is projected onto an image captured at the location of each camera.

For example, in the computation of the relationship of correspondence between two images, when a point corresponding to a point projected onto a left image is searched for in a right image, the corresponding point can be accurately and rapidly computed if the corresponding point is searched for around a previously projected point.

Pixels (hereinafter referred to as "candidate points") projected onto each image are computed for the entire face region based on the depth information, and 2D triangulation is performed based on the candidate points.

When there are no candidate points (no depth information), the boundary surfaces of objects are detected in the images and the entire image regions are triangulated based on the detected boundary surfaces. Differences are computed for the created triangles by comparing the color values of the images, and the differences are converted using camera information, thereby computing the 3D coordinates of the points.

In this case, the triangles may be considered to have the same depth value.

When the candidate points are distributed within a short distance, the computational time can be reduced, and the accuracy of 3D reconstruction can be improved because unnecessarily large triangles are not created.

If there is no depth information, a method that is disclosed in the thesis, A. Geiger, M. Roser, and Raquel Urtasun, "Efficient Large-Scale Stereo Matching," Asian Conference on Computer Vision, New Zealand, November 2010, may be used as a method of computing the relationship of correspondence using triangulation.

Once the 3D appearance has been reconstructed, the texture processing unit 600 maps the texture image to the 3D appearance image using the geometrical information of the computed appearance. Here, a high-quality reconstructed image can be acquired by mapping high-resolution texture to low-resolution reconstruction results using step size information.

Figure 4:
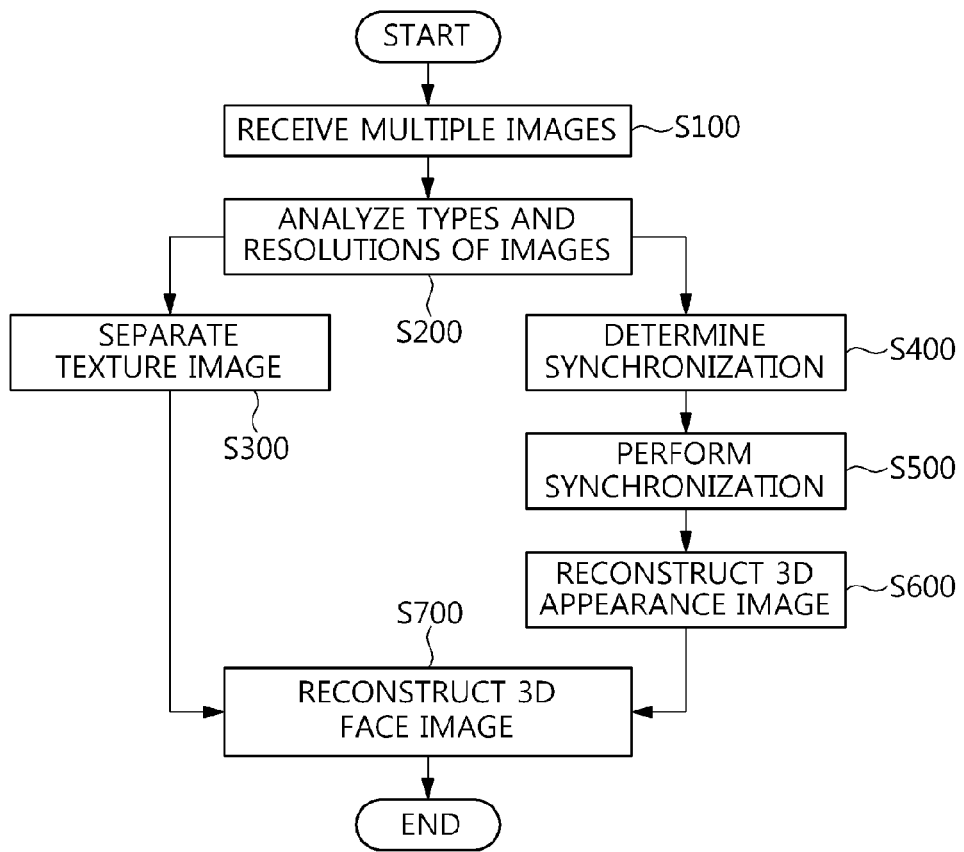
FIG. 4 is a flowchart showing a process of reconstructing a 3D face based on multiple cameras according to an embodiment of the present invention.

FIG. 4 is a flowchart showing a process of reconstructing 3D faces based on multiple cameras according to an embodiment of the present invention.

Referring to FIG. 4, in the process of reconstructing 3D faces based on multiple cameras, first, images are received from a plurality of cameras at step S100.

Thereafter, the types and resolutions of the received images are analyzed at step S200.

Thereafter, a texture processing image is separated by comparing the resolutions of the images at step S300.

Here, the texture processing image may be an image whose resolution is the highest of those of the received images.

Thereafter, it is checks whether the received images except the separated image have been synchronized with each other at step S400.

Here, when a color image is included in the received images except the separated image, the checking of the synchronization may be performed by converting the color image into a grayscale image, computing the insufficiency level of the synchronization between the grayscale image and the other images, determining whether the insufficiency level of the synchronization is equal to or higher than a predetermined allowable reference value, and determining the images to be asynchronous images if the insufficiency of synchronization is equal to or higher than the predetermined allowable reference value.

Thereafter, the images that are determined to be asynchronous images are synchronized at step S500.

Here, the synchronization may be performed by dividing the frames of the images determined to be asynchronous images by a predetermined time interval, storing the images determined to be asynchronous images in the plurality of image buffers, respectively, detecting the time interval of a frame whose synchronization level is the highest of those of the asynchronous images, and taking an image in the time interval as a synchronous image.

Here, the image buffers are classified into one or more color image buffers for processing color images and depth image buffers for processing depth image buffers. The number of buffers may be equal to the number of cameras that received images.

Thereafter, depth information is extracted from the synchronized images, 3D coordinate values are computed using the extracted depth information, and a 3D appearance image is reconstructed at step S600

Here, the construction of the 3D appearance image may be performed by computing 3D coordinates of an object using the depth information of a depth image received from a depth image camera, projecting the 3D coordinates into the location of a color image camera, determining the relationship of correspondence between the depth image and a color image, and then reconstructing a 3D appearance image.

Here, the construction of the 3D appearance image may be performed by triangulating the entire image regions based on the boundary surfaces of objects in color images received from a plurality of color image cameras, computing differences for created triangles by comparing the color values of the images, and converting the differences into 3D coordinate using camera information, thereby reconstructing a 3D appearance image.

Thereafter, a 3D face image is reconstructed by mapping a texture processing image to the 3D appearance image at step S700

Here, the 3D face image may be reconstructed by mapping the texture processing image to the 3D appearance using the step size information of images used as the texture processing image and the 3D appearance image.

Figure 5:
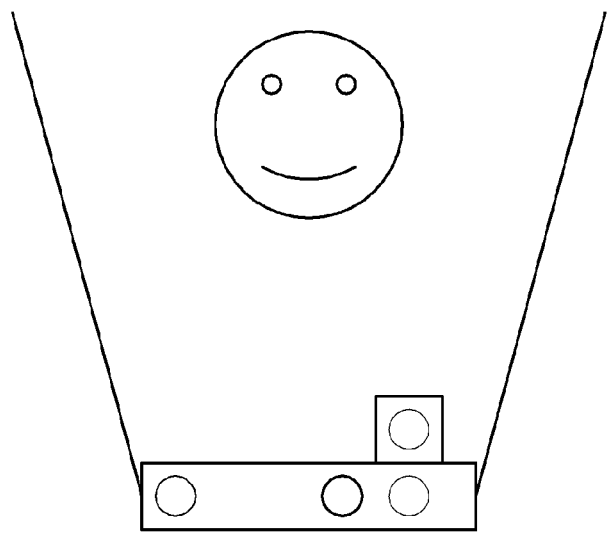
FIGS. 5 to 8 are diagrams showing the variety of combinations of cameras of the apparatus for reconstructing a 3D face based on multiple cameras according to embodiments of the present invention.
Figure 6:
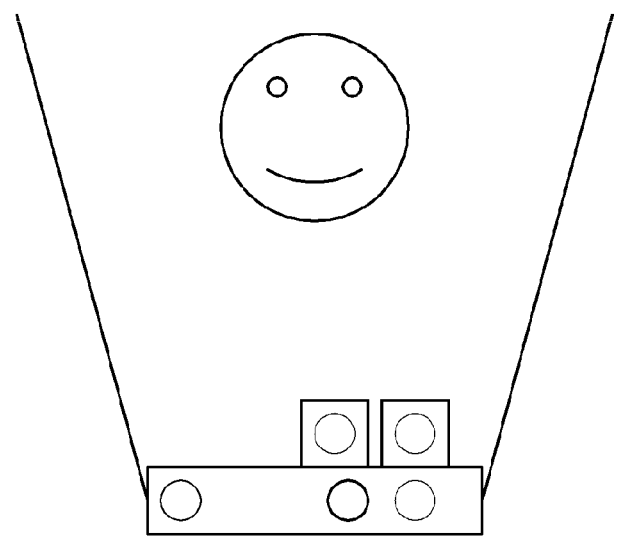

Apparatuses for reconstructing 3D faces based on multiple cameras according to other embodiments of the present invention may have configurations that are modified by a variety of combinations of color and depth cameras. The variety of combinations may include a combination in which a color camera and a depth camera are installed together in front of an object and capture images, as shown in FIG. 5, a combination in which a color camera is added to the combination of FIG. 5 and then images are captured, as shown in FIG. 6, a combination in which two combinations, each of which is shown in FIG. 5, are installed at different angles and capture images, as shown in FIG. 7, and a combination in which two combinations, each of which is shown in FIG. 6, are installed at different angles and capture images, as shown in FIG. 8.

Figure 7:
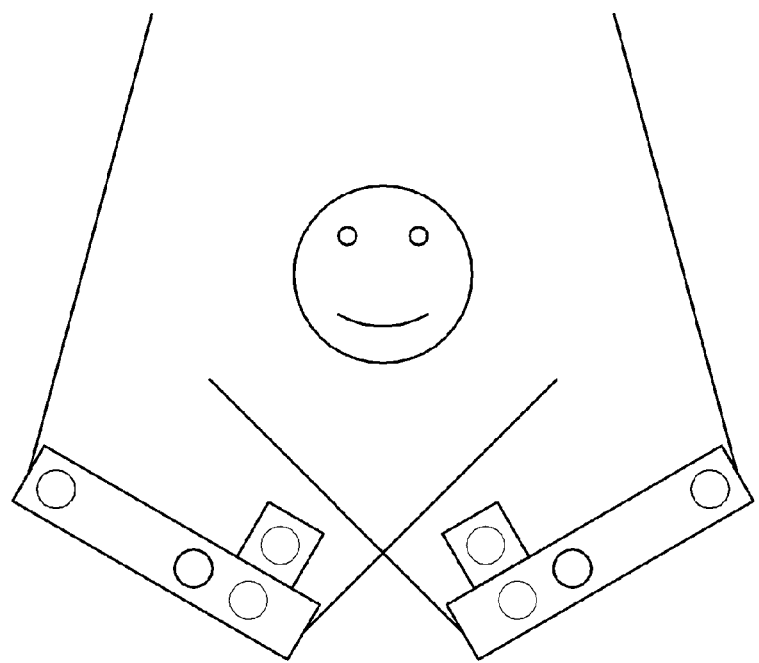
Figure 8:
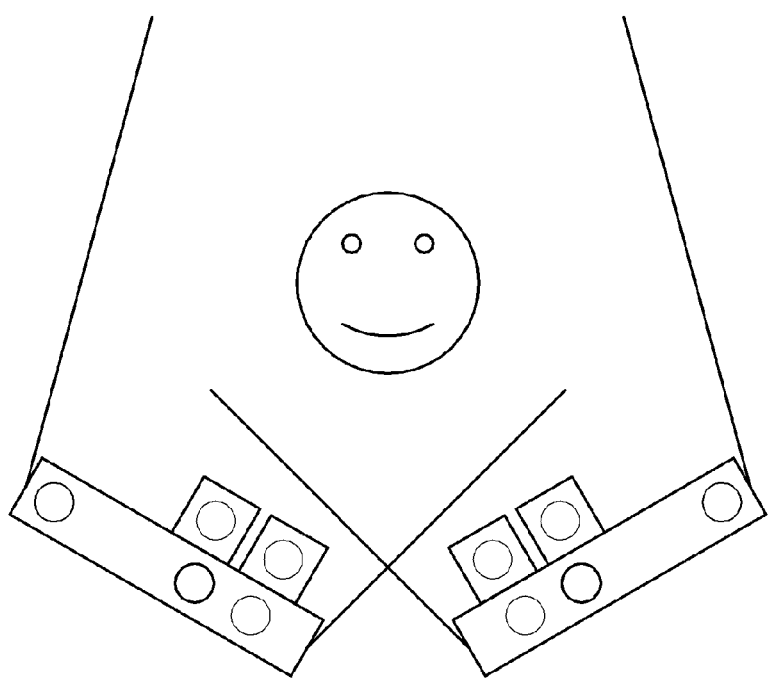

Meanwhile, although in FIG. 7, color cameras are shown as being installed on depth cameras, respectively, the color cameras may be installed on any one of the depth cameras, or may be installed on the depth cameras, respectively.

Alternatively, it may be possible to apply a color camera to one of a plurality of depth cameras as a single color camera and use a color image collected by the color camera as a texture image. Alternatively, it may be possible to apply a plurality of color cameras to a plurality of depth cameras, respectively, select one from among a plurality of color images collected by a plurality of color cameras, and use the selected color image as a texture image.

The above-described combinations are merely the embodiments of the present invention, and may be modified and varied depending on their purposes. For example, for beauty and medical applications, an additional lighting device and an additional information capturing device may be added to fit the purposes thereof.

The present invention is advantageous in that a 3D face can be reconstructed using multiple heterogeneous or homogeneous cameras regardless of the synchronization of images.

Furthermore, the present invention is advantageous in that when the combination of multiple cameras is determined and then installed in a combined form, the system can be used without additional manipulation, has higher cost competitiveness compared to conventional systems and can achieve high-quality reconstruction results.

Furthermore, the present invention is advantageous in that the system can be operated without an expert because the location of the face of a user is not significantly changed and thus complicated calibration, matching or synthesis is not required.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for reconstructing three-dimensional (3D) faces based on multiple cameras, comprising:
    a multi-image analysis unit configured to determine resolution information of images received from a plurality of cameras, and to determine whether the images have been synchronized with each other;
    a texture image separation unit configured to separate a texture processing image by comparing resolutions of the received images;
    a reconstruction image automatic synchronization unit configured to synchronize images that are determined to be asynchronous images by the multi-image analysis unit;
    a 3D appearance reconstruction unit configured to compute 3D coordinate values of the synchronized images, and to reconstruct a 3D appearance image; and
    a texture processing unit configured to reconstruct a 3D image by mapping the texture processing image to the 3D appearance image,
    wherein the reconstruction image automatic synchronization unit comprises:
        a plurality of image buffers configured to divide frames of the images determined to be asynchronous images by a predetermined time interval and then store the divided asynchronous images; and
        a synchronization checking unit configured to detect a time interval of a frame whose synchronization is the highest of the images determined to be asynchronous images and then takes an image in the time interval as a synchronous image.

2. The apparatus of claim 1, wherein the reconstruction image automatic synchronization unit operates in different modes depending on whether a depth image is included in the received images.

3. The apparatus of claim 2, wherein the 3D appearance reconstruction unit computes 3D coordinates of an object using depth information of a depth image received from a depth image camera, and then reconstructs the 3D appearance image.

4. The apparatus of claim 2, wherein the 3D appearance reconstruction unit triangulates entire image regions based on boundary surfaces of an object in color images received from a plurality of color image cameras, and then reconstructs the 3D appearance image.

5. The apparatus of claim 1, wherein the texture image separation unit separates an image whose resolution is highest of those of the received images as the texture processing image.

6. The apparatus of claim 1, wherein the multi-image analysis unit comprises:
    an image resolution comparison unit configured to analyze resolutions of the received images, and to compare the resolutions of the images;
    an image information classification unit configured to classify the received images into color images or depth images; and
    a synchronization checking unit configured to convert an image classified as a color image by the image information classification unit into a grayscale image, and to determine whether the grayscale image and the remaining images have been synchronized with each other.

7. The apparatus of claim 1, wherein the image buffers are classified into one or more color image buffers for processing color images and one or more image buffers for processing depth images, and a number of image buffers is equal to a number of cameras that received images.

8. A method of reconstructing a 3D face using an apparatus for reconstructing 3D faces based on multiple cameras, comprising:
    receiving images from a plurality of cameras;
    analyzing types and resolutions of the received images;
    separating a texture processing image by comparing the resolutions of the analyzed images;
    checking whether the received images except the separated image have been synchronized with each other;
    synchronizing images determined to be asynchronous images with each other;
    computing 3D coordinate values for the synchronized images and reconstructing a 3D appearance image; and
    mapping the texture processing image to the 3D appearance image,
    wherein checking comprises:
        converting a color image into a grayscale image when the color image is included in the received images except the separated image;
        computing an insufficiency level of synchronization between the grayscale image and the remaining images; and
        determining whether the insufficiency level of synchronization is equal to or higher than a predetermined allowable reference value, and determining the images to be asynchronous images when the insufficiency level of synchronization is equal to or higher than the predetermined allowable reference value.

9. The method of claim 8, wherein separating comprises separating an image whose resolution is the highest of those of the analyzed images as the texture processing image.

10. The method of claim 8, wherein mapping comprises reconstructing a 3D face image by mapping the texture processing image to the 3D appearance image using step size information of images that are used as the texture processing image and the 3D appearance image.

11. The method of claim 8, wherein analyzing is performed in different 3D appearance image reconstruction modes depending whether a depth image is included in the received images.

12. The method of claim 11, wherein computing and reconstructing comprises:
   computing 3D coordinates of an object using depth information of a depth image received from a depth image camera; and
   projecting the 3D coordinates onto a location of a color image camera, determining a relation of correspondence between the depth image and a color image, and reconstructing the 3D appearance image.

13. The method of claim 11, wherein computing and reconstructing comprises:
   triangulating entire image regions based on boundary surfaces of an object in color images received from a plurality of color image cameras;
   computing differences by comparing color values of the images for triangles created by the triangulation; and
   computing 3D coordinates for the differences using camera information and then reconstructing the 3D appearance image.

14. A method of reconstructing a 3D face using an apparatus for reconstructing 3D faces based on multiple cameras, comprising:
   receiving images from a plurality of cameras;
   analyzing types and resolutions of the received images;
   separating a texture processing image by comparing the resolutions of the analyzed images;
   checking whether the received images except the separated image have been synchronized with each other;
   synchronizing images determined to be asynchronous images with each other;
   computing 3D coordinate values for the synchronized images and reconstructing a 3D appearance image; and
   mapping the texture processing image to the 3D appearance image,
   wherein synchronizing comprises:
      dividing frames of the images determined to be the asynchronous images by a predetermined time interval;
      storing the images determined to be asynchronous images in a plurality of image buffers, respectively; and
      detecting a time interval of a frame whose synchronization is the highest of the images determined to be asynchronous images and then taking an image in the time interval as a synchronous image.

15. The method of claim 14, wherein the image buffers are classified into one or more color image buffers for processing color images and one or more image buffers for processing depth images, and a number of image buffers is equal to a number of cameras that received images.

* * * * *